United States Patent
Huang

(10) Patent No.: US 12,372,805 B2
(45) Date of Patent: Jul. 29, 2025

(54) CONNECTION STRUCTURE OF SPECTACLE FRAME

(71) Applicant: Wen-Tse Huang, Kaohsiung (TW)

(72) Inventor: Wen-Tse Huang, Kaohsiung (TW)

( * ) Notice: Subject to any disclaimer, the term of this patent is extended or adjusted under 35 U.S.C. 154(b) by 437 days.

(21) Appl. No.: 18/070,678

(22) Filed: Nov. 29, 2022

(65) Prior Publication Data

US 2023/0213783 A1   Jul. 6, 2023

(30) Foreign Application Priority Data

Jan. 6, 2022 (TW) ................................ 111200164

(51) Int. Cl.
*G02C 5/22* (2006.01)
*G02C 5/14* (2006.01)

(52) U.S. Cl.
CPC ................. *G02C 5/22* (2013.01); *G02C 5/14* (2013.01); *G02C 5/2209* (2013.01)

(58) Field of Classification Search
CPC .. G02C 5/2209; G02C 2200/22; G02C 5/146; G02C 5/16; G02C 5/2254
See application file for complete search history.

(56) References Cited

U.S. PATENT DOCUMENTS

| | | | | |
|---|---|---|---|---|
| 8,827,444 | B1* | 9/2014 | Koo | G02C 5/2254 |
| | | | | 351/111 |
| 2005/0259218 | A1* | 11/2005 | Habermann | G02C 1/08 |
| | | | | 351/41 |
| 2015/0029457 | A1* | 1/2015 | Bystritsky | G02C 5/16 |
| | | | | 351/178 |
| 2019/0353923 | A1* | 11/2019 | Ricart Gisbert | G02C 1/08 |

FOREIGN PATENT DOCUMENTS

WO    WO-2012160154 A1 *  11/2012  ............... G02C 1/08

* cited by examiner

*Primary Examiner* — Cara E Rakowski
(74) *Attorney, Agent, or Firm* — Best & Flanagan LLP

(57) ABSTRACT

A connection structure of a spectacle frame includes a frame, a connection member, and a temple. The frame is provided with a joint portion at each of both sides thereof, and a pivot shaft protrudes from each of upper and lower surfaces of a joint end of the joint portion. The connection member includes a body provided with a through-hole and having first and second abutting portions at rear and front sides of the through-hole. A head end of the connection member is provided with two shaft holes to respectively connect the two pivot shafts. The temple has a bending portion and an elastic piece extending from the bending portion and passing through the through-hole, such that the bending portion abuts against the first abutting portion and the second abutting portion to allow the temple relative to the frame to be folded inward or stretched outward.

2 Claims, 4 Drawing Sheets

CONNECTION STRUCTURE OF SPECTACLE FRAME

BACKGROUND OF THE INVENTION

1. Field of the Invention

The present invention relates to a connection structure of a spectacle frame and, more particularly, to a connection structure for elastically fixing the temples to the frame of the spectacle frame.

2. Description of the Related Art

A conventional spectacle frame generally includes a frame and two temples pivotally fitted at both sides of the frame. Each temple directly joins the frame with a screw to form a joint-like structure, so that the temples can be folded inward or stretched outward.

However, the screws may be loosened gradually after a long period, causing the temples to loosen and even fall off from the frame.

In addition, after the temples are folded many times, the threaded holes where the screws are locked may be damaged, causing the screws to be easily loosened, which makes maintenance difficult.

BRIEF SUMMARY OF THE INVENTION

Thus, an objective of the present invention is to provide a connection structure of a spectacle frame for assembling a temple and a frame of the spectacle frame without requirement of any screw. The connection structure utilizes an elastic piece which is formed at the front end of the temple to pass through a connection member pivotally connected with the frame, so that the temple has a positioning elastic force for folding and unfolding.

To achieve this and other objectives, a connection structure of a spectacle frame of the present invention includes a frame, a connection member and a temple. The frame is provided with a joint portion at each of both sides thereof. A joint end is formed at a tail end of the joint portion, and a pivot shaft protrudes from each of upper and lower surfaces of the joint end. The connection member includes a body and a head end. The head end is provided with two spaced shaft holes to respectively connect the two pivot shafts of the joint end. The body is provided with a through-hole therein and has first and second abutting portions located at rear and front sides of the through-hole, respectively. The temple has an inwardly bent bending portion at an end thereof, and an elastic piece extends from a front end of the bending portion. The elastic piece of the temple passes through the through-hole of the connection member, such that an inner side of a rear end of the bending portion abuts against the first abutting portion, and an outer side of a front end of the bending portion abuts against the second abutting portion. The two shaft holes of the connection member are respectively engaged with the two pivot shafts of the joint end, and the elastic piece abuts against an outer surface of the joint end of the joint portion, so that the temple is in an open position. When the temple is turned inwards toward the frame with the pivot shafts as a rotational axis, the elastic piece turns to form an included angle with the joint end of the joint portion, and the elastic piece generates a deformable elastic force to fix the temple in a folded position.

In a preferred form, the included angle is an acute angle.

The connection structure of a spectacle frame of the present invention features the temple and the frame, both of which are assembled with no screw required, and avoids drawbacks like screw-based components loosened frequently. Moreover, in the present invention, the bending portion and the elastic piece arranged at the front end of the temple are used to respectively abuts against the connection member and the joint end with the connection member pivotally connected to the joint portion, so that the temple have an elastic force and a clamping force in the open and folded positions to allow the temple relative to the frame to be folded inward or stretched outward.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
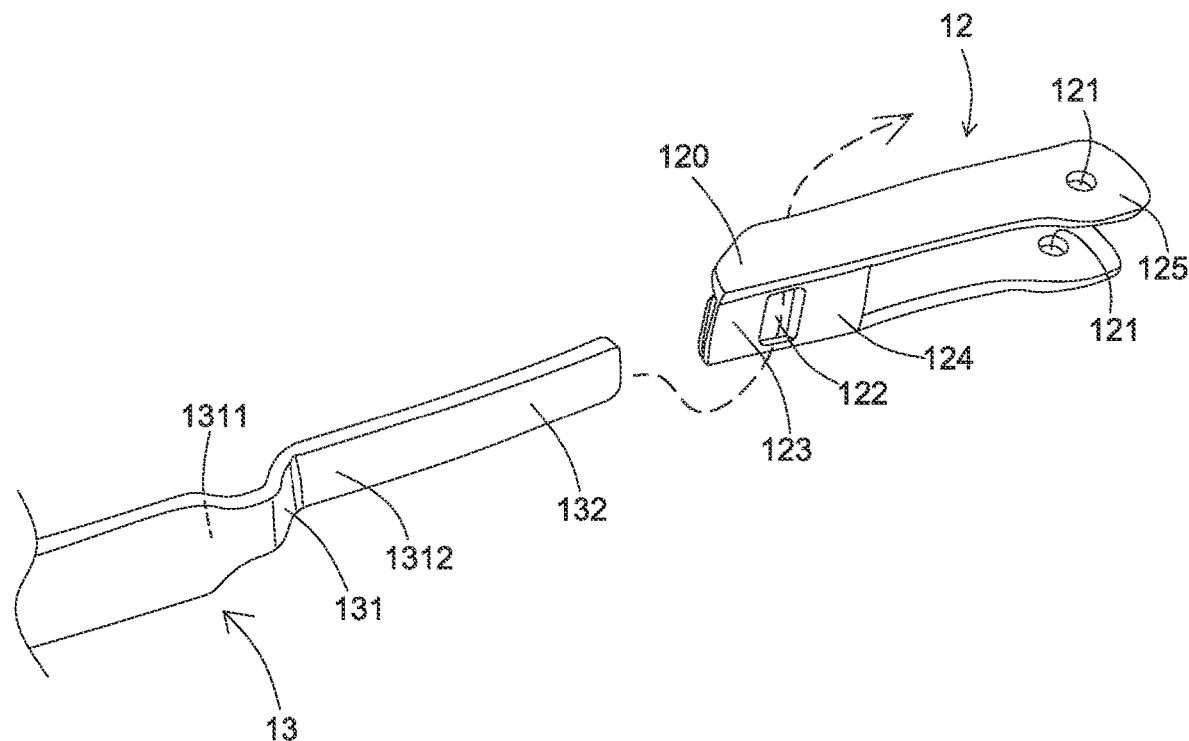
FIG. 1 is an exploded, perspective view of a temple and a connection member of the present invention.
Figure 2:
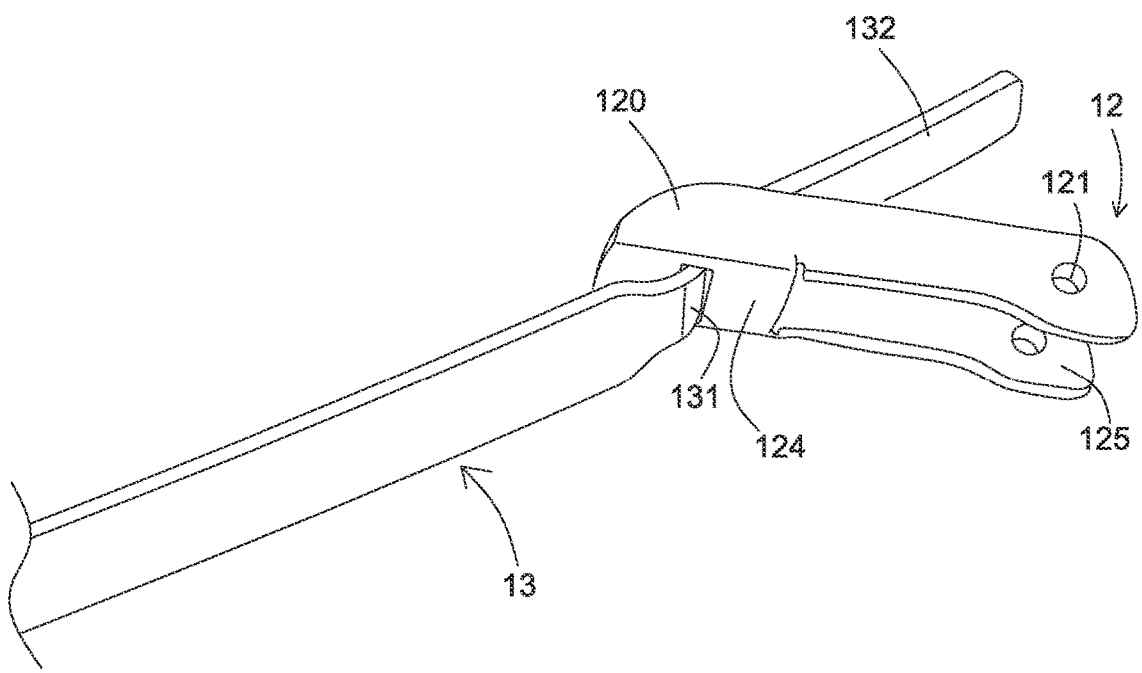
FIG. 2 is a perspective view illustrating the combination of the temple and the connection member in FIG. 1.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood.

Where used in the various figures of the drawings, the same numerals designate the same or similar parts. Furthermore, when the terms "first", "second", "inner", "outer", "side", "end", "portion", "front", "rear", "upper", "lower", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

A connection structure of a spectacle frame 1 according to an embodiment of the present invention is shown in FIGS. 1 through 4 of the drawings. The spectacle frame 1 generally includes a frame 11, two connection members 12, and two temples 13. The frame 10 is provided with a joint portion 111 at each of both sides thereof. A joint end 1111 is formed at the tail end of the joint portion 111, and a pivot shaft 1112 protrudes from each of the upper and lower surfaces of the joint end 1111. Each connection member 12 includes a body 120 and a head end 125 at an end of the body 120. The head end 125 is provided with two spaced shaft holes 121 to connect the pivot shafts 1112 of the joint end 1111. The body 120 is provided with a through-hole 122 therein and has first and second abutting portions 123 and 124 located at the rear and front sides of the through-hole 122, respectively. One end of each temple 13 has a bending portion 131 bent inward, and an elongated elastic piece 132 extends from a front end of the bending portion 131.

Figure 3:
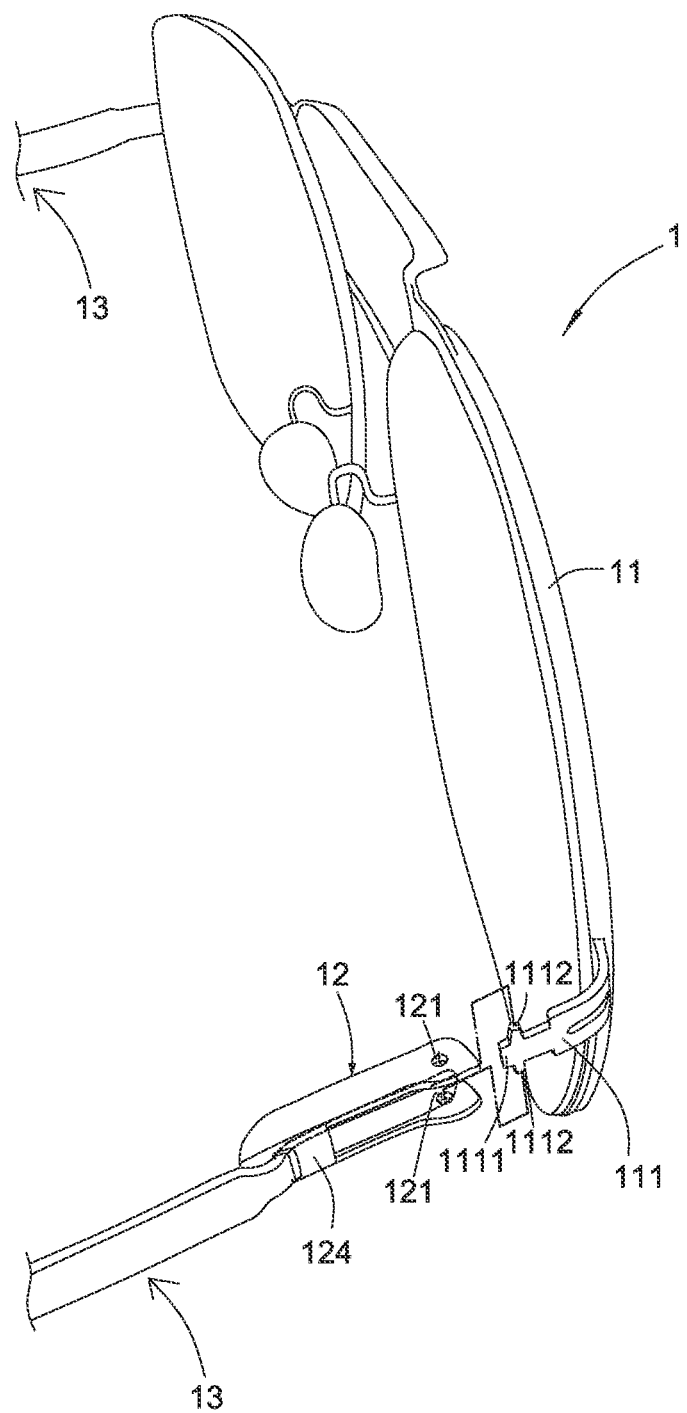
FIG. 3 is a perspective view illustrating the disassembly of the connection member and a frame of the present invention.
Figure 4:
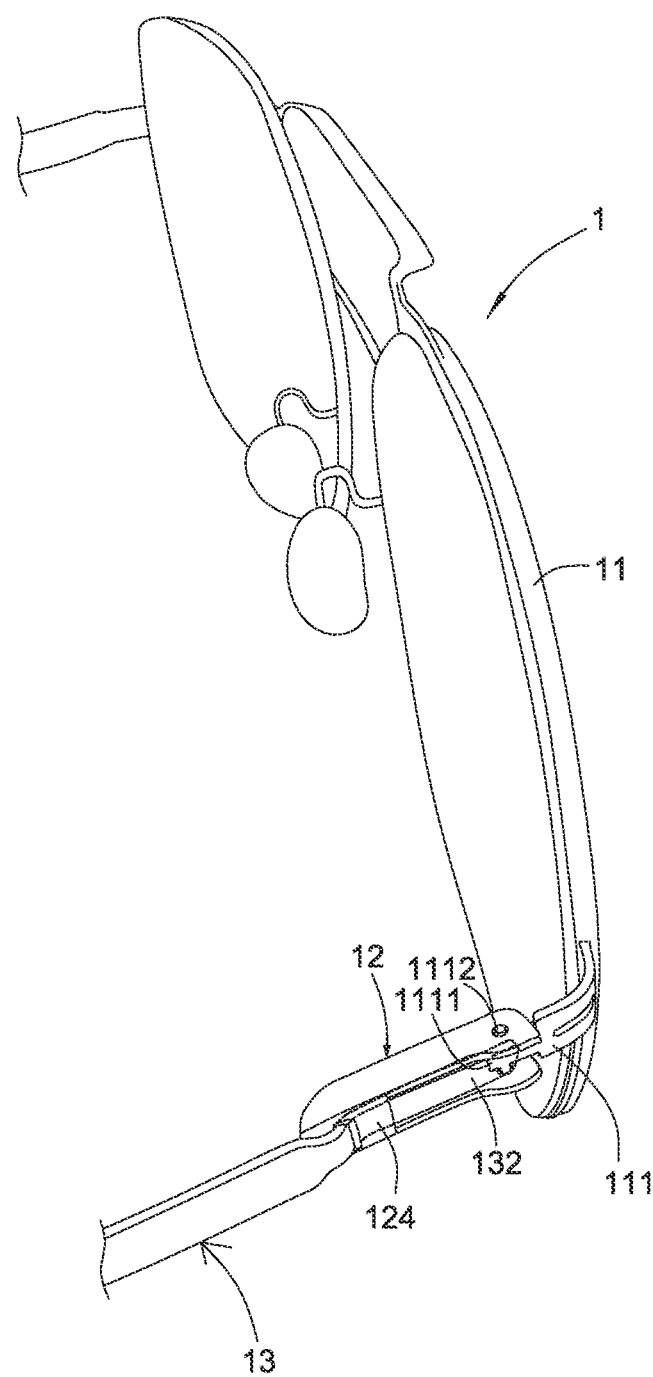
FIG. 4 is a perspective view illustrating the combination of the frame and the connection member in FIG. 3.
Figure 5:
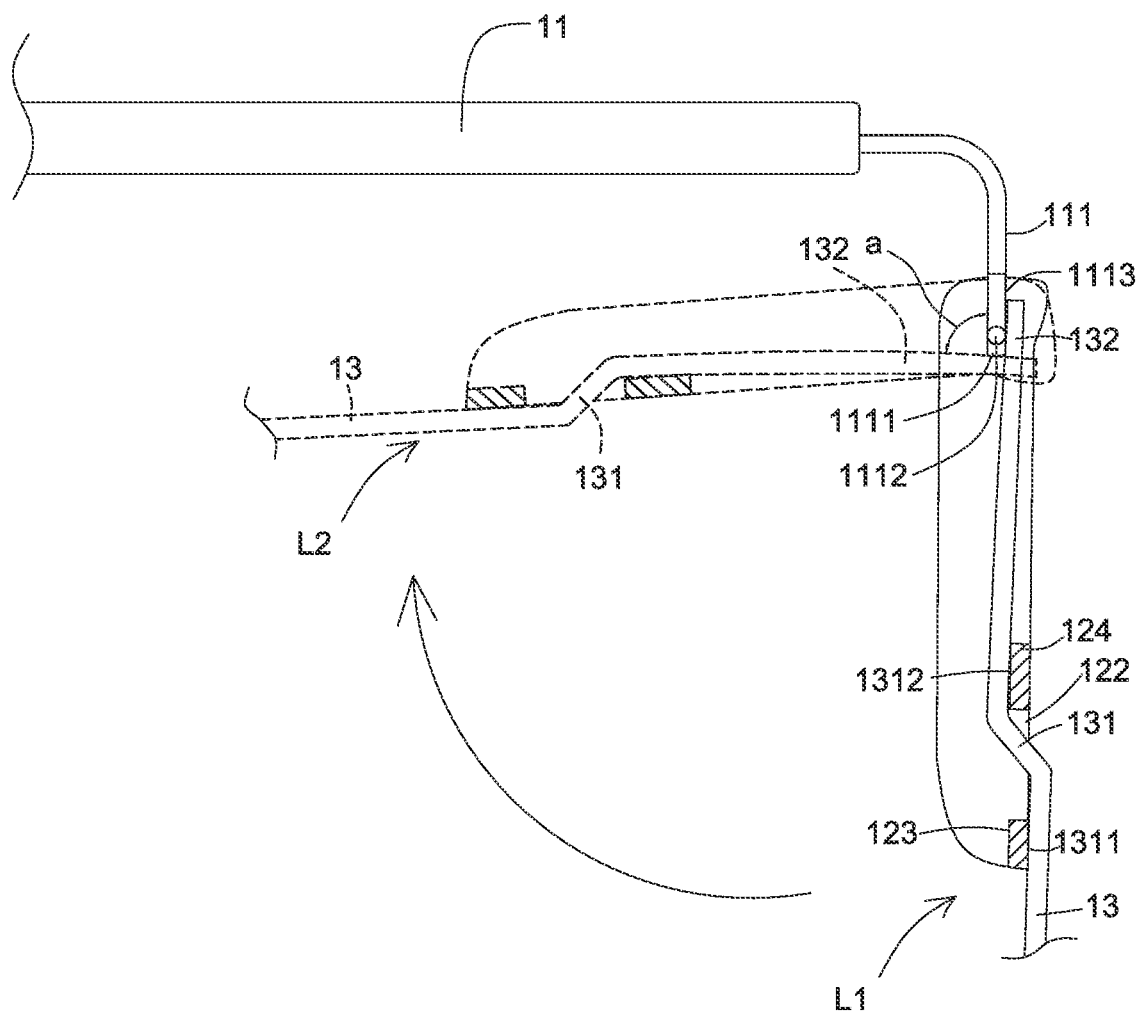
FIG. 5 is a schematic view illustrating that the temple is folded relative to the frame.

With reference to FIGS. 3 through 5, in assembly of the spectacle frame 1, the elastic piece 132 of the temple 13 is passed through the through-hole 122 of a corresponding connection member 12 from the outside of the connection member 12 (that is, the outside according to the wearing direction), such that the inner side 1311 of a rear end of the bending portion 131 abuts against the first abutting portion 123, and the outer side 1312 of a front end of the bending portion 131 abuts against the second abutting portion 124. Then, the shaft holes 121 in the connection member 12 are respectively engaged with the pivot shafts 1112 on the joint end 1111, and an end of the elastic piece 132 abuts against an outer surface 1113 of the joint end 1111 of the joint portion 111, so that the pivot shafts 1112 are held in the shaft holes 121 with the temple 13 in an open position L1. As such, the temple 13 is integrated with a corresponding joint portion 111 of the frame 11 through the connection member 12 to allow the temple 13 relative to the frame 11 to be folded inward or stretched outward. When the temple 13 is to be folded, the temple 13 is turned inwards toward the frame 11 with the pivot shafts 1112 as a rotational axis, so that the elastic piece 132 turns to an outer end of the joint end 1111 and forms an included angle (a) with the joint end 1111 of the joint portion 111, and that the elastic piece 132 generates a deformable elastic force to fix the temple 13 in a folded position L2.

Since the elastic piece 132 abuts against the joint end 1111 of the joint portion 111 when temple 13 is opened outward (see FIG. 5), the temple 13 which is opened outward will not be excessively stretched and stays at a proper open angle by which a user is able to comfortably wear a pair of eyeglasses constructed with the connection structure of the present invention. Moreover, the temples 13 can be separated from the frame 11 and replaced by a different style of temple easily with no tool required.

The scope of the invention is to be indicated by the appended claims, rather than by the foregoing description, and all changes which come within the meaning and range of equivalency of the claims are intended to be embraced therein.

The invention claimed is:

1. A connection structure of a spectacle frame, comprising:
 a frame provided with a joint portion at each of both sides thereof, wherein a joint end is formed at a tail end of the joint portion, and a pivot shaft protrudes from each of upper and lower surfaces of the joint end;
 a connection member including a body and a head end, wherein the head end is provided with two spaced shaft holes to respectively connect the two pivot shafts of the joint end, wherein the body is provided with a through-hole therein and has first and second abutting portions located at rear and front sides of the through-hole, respectively; and
 a temple having an inwardly bent bending portion at an end thereof, wherein an elastic piece extends from a front end of the bending portion,
 wherein the elastic piece of the temple is passed through the through-hole of the connection member, such that an inner side of a rear end of the bending portion abuts against the first abutting portion, and an outer side of a front end of the bending portion abuts against the second abutting portion, wherein the two shaft holes of the connection member are respectively engaged with the two pivot shafts of the joint end, and the elastic piece abuts against an outer surface of the joint end of the joint portion, so that the temple is in an open position, wherein when the temple is turned inwards toward the frame with the two pivot shafts as a rotational axis, the elastic piece turns to form an included angle with the joint end of the joint portion, and the elastic piece generates a deformable elastic force to fix the temple in a folded position.

2. The connection structure according to claim 1, wherein the included angle is an acute angle.

\* \* \* \* \*